United States Patent Office 3,631,196
Patented Dec. 28, 1971

3,631,196
OXYGEN-CONTAINING TETRASILA-ADAMANTANE COMPOUNDS
Jerome M. Klosowski, Bay City, Mich., assignor to Dow Corning Corporation, Midland, Mich.
No Drawing. Filed May 18, 1970, Ser. No. 38,497
Int. Cl. C07d 103/02
U.S. Cl. 260—448.2 D      13 Claims

ABSTRACT OF THE DISCLOSURE

Tetrasila-adamantane compounds, in which one of the methylene linkages is replaced with an oxygen linkage and in which at least one of the silicon atoms contains a methyl substituent, are useful as mosquito repellents.

---

This invention relates to novel oxygen-containing tetrasila-adamantanes. In one aspect, the invention relates to an insect repellant.

Tetrasila-adamantane compounds can be represented by the simplified structural formula

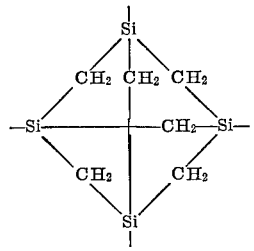

This cage structure, whose four bridgehead silicon valences are tetrahedrally arranged, forms a tetravalent nucleus which can be conveniently represented by the symbol "Ad." The methyl-substituted tetrasila-adamantane, $(CH_3)_4Ad$, has been produced by the pyrolysis of tetramethylsilane at 650° C.—see Fritz et al., "Carbosilanes," Advances in Inorganic and Radiochemistry, vol. 7, page 349, Academic Press (1965). The chlorinated compound, $AdCl_4$, was obtained in very low yield from the high temperature (500° C.) reaction of tetrachlorosilane and trimethylchlorosilane in the presence of aluminum chloride as reported in JACS, 83, 3345 (1961). These compounds are stable to hydrolysis and utility for the tetrasila-adamantane compounds has not been suggested in the prior art.

One particularly efficient method of producing $$(CH_3)_nAdX_{(4-n)}$$

wherein X is a chlorine or bromine atom, n is an integer of from 1 to 4, is by the aluminum halide catalyzed rearrangement of dimethylsilmethylene compounds, such as $[(CH_3)_2SiCH_2]_2$, $[(CH_3)_2SiCH_2]_4$, $[(CH_3)_3Si]_2CH_2$ and

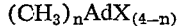

As described in copending application Ser. No. 38,496, entitled "Method of Producing Tetrasila-Adamantanes" filed May 18, 1970, the rearrangement proceeds rapidly at atmospheric pressure and temperatures of about 100° C. in the presence of from 10 to 100 weight percent of the catalyst to yield a reaction mixture containing the tetrasila-adamantanes. It has been found that, in certain instances, the above-described reaction mixture contains a by-product which can be hydrolyzed to yield a tetrasila-adamantane structure in which one methylene linkage has been replaced with an oxygen linkage.

Thus, it is an object of the invention to provide novel, useful oxygen-containing tetrasila-adamantane compounds.

In accordance with the invention, there are provided compounds of the general formula

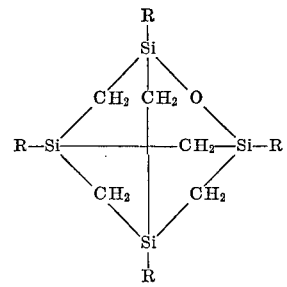

in which each R is independently selected from the group consisting of the methyl radical, the chlorine atom and the bromine atom, at least one R group being a methyl radical.

For convenience, these compounds will be designated herein as "$R_4Ad(-O-)$" compounds. Thus, included within the scope of the invention are compounds of the formula $(CH_3)_4Ad(-O-)$, $(CH_3)_3ClAd(-O-)$,
$(CH_3)_3BrAd(-O-)$, $(CH_3)_2Cl_2Ad(-O-)$,
$(CH_3)_3BrAd(-O-)$, $CH_3Cl_3Ad(-O-)$ and

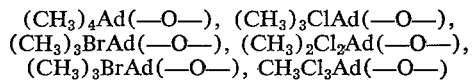

The compounds of the invention are produced by hydrolysis of the reaction mixture resulting from the aluminum chloride or aluminum bromide catalyzed rearrangement of silmethylene compounds selected from the group consisting of $[(CH_3)_2SiCH_2]_n$, where n is an integer having a value of 2 or greater, $[(CH_3)_2XSi]_2CH_2$, where X is a chlorine or bromine atom, $[(CH_3)_3Si]_2CH_2$ and mixtures thereof.

The silmethylene reactants include $[(CH_3)_2SiCH_2]_2$, $[(CH_3)_2SiCH_2]_{4-6}$,
$[(CH_3)_2SiCH_2]_{10-20}$, $[(CH_3)_2SiCH_2]_{50}$,
$[(CH_3)_2ClSi]_2CH_2$, $[(CH_3)_2BrSi]_2CH_2$ and

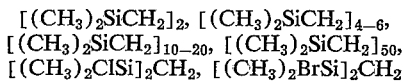

This rearrangement reaction can be carried out at from room temperature to the reflux temperature of the reactants under atmospheric pressure at catalyst levels of from 10 to 100 weight percent based on the weight of reactants. To obtain a rapid rate or reaction and appreciable yields, it is preferred to carry out the rearrangement at above 80° C. in the presence of from 30 to 100 weight percent, based on the weight of reactants, of catalyst. The reaction is generally run in the absence of solvents, but, if desired, a suitable solvent, such as benzene, can be used. This reaction yields a mixture of products, including tetrasila-adamantanes. Hydrolysis of the above-described reaction mixture gives the novel $R_4Ad(-O-)$ compounds of the invention. This hydrolysis can be accomplished by conventional methods, such as by addition of water at room temperature. The particular component of the reaction mixture which is the precursor to the $R_4Ad(-O-)$ compounds has not been isolated but is believed to have an open-cage structure represented by the formula

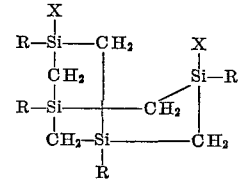

The product mixture obtained from the hydrolysis step contains both $R_4Ad$ and $R_4Ad(\text{—O—})$ compounds in addition to nonvolatile tars. This product mixture can be separated by fractional sublimation or recrystallization to obtain pure $R_4Ad(\text{—O—})$ compounds.

If desired, the rearrangement reaction can be carried out in the presence of a suitable halogenating agent such as acetyl chloride, acetyl bromide, methyltrichlorosilane, dimethyldichlorosilane, methyltribromosilane, trimethylchlorosilane, dimethyldibromosilane and the like. The addition of such halogenating agents is believed to increase the yield of the proposed precursor and also results in greater yields of $R_4Ad(\text{—O—})$ compounds in which at least one R substituent is a halogen (bromine or chlorine) atom.

In contrast to the unstrained tetrasila-adamantane compounds, infrared spectroscopy indicates that the

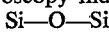

bond in the $R_4Ad(\text{—O—})$ compounds is strained (SiOSi asymmetric stretch at 10.6µ). It is suggested that the strained structure could be subjected to a ring-opening reaction and polmerized to form siloxanes having polycyclic silmethylene units in the polymer backbone. In addition to being possible polymer precursors, the $R_4Ad(\text{—O—})$ compounds of the invention are useful as mosquito repellents when applied to the human skin in small quantities.

EXAMPLE 1

Aluminum chloride (25 grams) was placed in a dry flask which had been purged with nitrogen. Dimethylsilmethylene cyclic dimer (50 grams) was added dropwise to the flask. The addition was exothermic. After adding the dimer, the reaction mixture was heated for 30 minutes at 85° C. after which 6.7 milliliters of acetyl chloride was added dropwise. The reaction mixture was then heated at 85° C. for 17 hours. The reaction mixture, a thick dark liquid, was allowed to cool to room temperature overnight. The reaction mixture was hydrolyzed by the addition of water and hexane. After separation, the organic layer contained $(CH_3)_4Ad(\text{—O—})$ and $(CH_3)_3ClAd(\text{—O—})$ as shown by GLC analysis.

EXAMPLE 2

Dimethylsilmethylene cyclic dimer (100 grams) was added dropwise to 40 grams of aluminum chloride in a nitrogen-purged flask. The reaction mixture was maintained at about 100° C. for five days after which hexane solvent (~74 mils.) was added. Water was added dropwise and the hydrolysis reaction was very exothermic. Solvent and excess water was removed to obtain the hydrolyzed reaction mixture which was a viscous liquid containing crystalline material. Analysis by GLC showed this product to contain 33 percent $(CH_3)_4Ad(\text{—O—})$.

EXAMPLE 3

The compounds of the invention were determined to be mosquito repellents by means of the following test: 2″ x 2″ shaved areas of skin on the tester's forearms were exposed for a given period of time to approximately 500 mosquitoes of the species Aëdes aegypti. The mosquitoes were contained in a 12″ x 12″ x 12″ cage and had been denied warm blood for 3 days prior to testing. The mosquitoes were excited and put to flight before the arm was put into the cage. The arm and hand was masked with polyethylene sheet material except for the test area.

As a control, the untreated skin was exposed to the mosquitoes and the number of landing and bites were observed, there being 21 landings and 15 bites in 2 minutes. A small amount (0.16 gram) of $(CH_3)_4Ad(\text{—O—})$ was applied to the test area and it was again exposed to the mosquitoes. After a period of 5 minutes, only two mosquitoes landed and there were no bites. Of greater significance is the fact that the two mosquitoes which landed died while on the skin.

That which is claimed is:

1. Compositions of the general formula

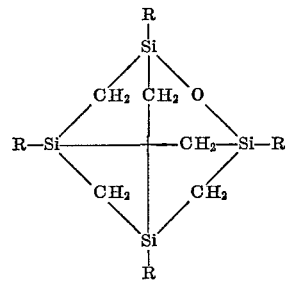

in which each R is independently selected from the group consisting of the methyl radical, the chlorine atom and the bromine atom, at least one R substituent being a methyl radical.

2. The composition of claim 1 wherein all of the R substituents are methyl radicals.

3. The composition of claim 1 wherein three of the R substituents are methyl radicals.

4. The composition of claim 3 wherein the remaining R substituent is a chlorine atom.

5. The composition of claim 1 wherein two of the R substituents are methyl radicals.

6. The composition of claim 5 wherein the remaining R substituents are chlorine atoms.

7. The composition of claim 1 wherein one of the R substituents is a methyl radical.

8. The composition of claim 7 wherein the remaining R substituents are chlorine atoms.

9. A method of preparing compounds of the formula

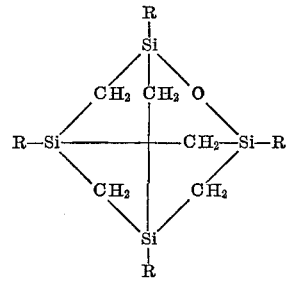

in which each R is independently selected from the group consisting of methyl radicals and the chlorine atom, at least one R substituent being a methyl radical; said method comprising the steps of:

(a) reacting silmethylene compounds selected from the group consisting of $\{(CH_3)_2SiCH_2\}_n$, in which n is an integer having a value of 2 or greater, $\{(CH_3)_2XSi\}_2CH_2$ in which X is a bromine or chlorine atom, $\{(CH_3)_3Si\}_2CH_2$ and mixtures thereof in the presence of a catalyst selected from the group consisting of aluminum chloride and aluminum bromide, said catalyst being present in an amount in the range of from 10 to 100 weight percent, based on the weight of silmethylene compounds, and (b) hydrolyzing the reaction mixture obtained from step (a).

10. The method of claim 9 wherein a halogenating agent is added to the reaction mixture during step (a).

11. The method of claim 10 wherein the halogenating agent is acetyl chloride.

12. The method of claim 9 wherein the catalyst is present in an amount in the range of 30 to 100 weight percent and the reaction is carried out at a temperature of at least 80° C.

13. The method of claim 12 wherein the catalyst is aluminum chloride.

References Cited
UNITED STATES PATENTS
3,342,880  9/1967  Reinhardt ____ 260—448.2 D X TOBIAS E. LEVOW, Primary Examiner P. F. SHAVER, Assistant Examiner U.S. Cl. X.R.

260—448.2 E; 424—184, Digest 10